US012358308B2

(12) United States Patent
Wakayama

(10) Patent No.: US 12,358,308 B2
(45) Date of Patent: Jul. 15, 2025

(54) IMAGE FORMING APPARATUS IN WHICH MANUAL TRANSPORT ROUTE CIRCUMVENTS REGION BETWEEN CASSETTE AND IMAGE FORMING DEVICE

(71) Applicant: KYOCERA Document Solutions Inc., Osaka (JP)

(72) Inventor: Kei Wakayama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 164 days.

(21) Appl. No.: 18/126,090

(22) Filed: Mar. 24, 2023

(65) Prior Publication Data

US 2023/0311545 A1 Oct. 5, 2023

(30) Foreign Application Priority Data

Mar. 31, 2022 (JP) ................................ 2022-059100

(51) Int. Cl.
*B41J 15/04* (2006.01)
*B65H 1/00* (2006.01)
*G03G 15/00* (2006.01)

(52) U.S. Cl.
CPC .............. *B41J 15/044* (2013.01); *B65H 1/00* (2013.01); *G03G 15/6502* (2013.01)

(58) Field of Classification Search
CPC ......... B41J 15/044; B41J 13/103; B65H 1/00; B65H 2402/10; B65H 2402/32; B65H 2405/332; B65H 2407/21; B65H 2801/06; B65H 1/266; B65H 5/26; G03G 15/6502
USPC .......................................................... 347/104
See application file for complete search history.

(56) References Cited

U.S. PATENT DOCUMENTS

2009/0201559 A1* 8/2009 Yamada ............ H04N 1/00519
358/474
2014/0292986 A1* 10/2014 Oki ....................... B41J 29/023
347/104

FOREIGN PATENT DOCUMENTS

JP 2018203479 A 12/2018

* cited by examiner

*Primary Examiner* — Jason S Uhlenhake
*Assistant Examiner* — Alexander D Shenderov
(74) *Attorney, Agent, or Firm* — IP Business Solutions, LLC.

(57) ABSTRACT

An image forming apparatus includes a first sheet cassette, a first transport route, an image forming device, and a second transport route. The first sheet cassette is for storing therein a sheet. Along the first transport route, the sheet delivered from the first sheet cassette is transported. The image forming device forms an image based on image data, on the sheet transported along the first transport route. The second transport route communicates with outside of the image forming apparatus, and a sheet inserted by a user from outside is transported along the second transport route, to the image forming device. The second transport route is formed so as to circumvent a region between the image forming device and the first sheet cassette.

9 Claims, 7 Drawing Sheets

IMAGE FORMING APPARATUS IN WHICH MANUAL TRANSPORT ROUTE CIRCUMVENTS REGION BETWEEN CASSETTE AND IMAGE FORMING DEVICE

INCORPORATION BY REFERENCE

This application claims priority to Japanese Patent Application No. 2022-059100 filed on Mar. 31, 2022, the entire contents of which are incorporated by reference herein.

BACKGROUND

The present disclosure relates to an image forming apparatus.

Image forming apparatuses are generally known, in which a manual transport route is provided between a cassette for storing sheets and an image forming device.

SUMMARY

The disclosure proposes further improvement of the foregoing techniques.

In an aspect, the disclosure provides an image forming apparatus including a first sheet cassette, a first transport route, an image forming device, and a second transport route. The first sheet cassette is for storing therein a sheet. Along the first transport route, the sheet delivered from the first sheet cassette is transported. The image forming device forms an image based on image data, on the sheet transported along the first transport route. The second transport route communicates with outside of the image forming apparatus, and a sheet inserted by a user from outside is transported along the second transport route, to the image forming device. The second transport route is formed so as to circumvent a region between the image forming device and the first sheet cassette.

DETAILED DESCRIPTION

Figure 1:
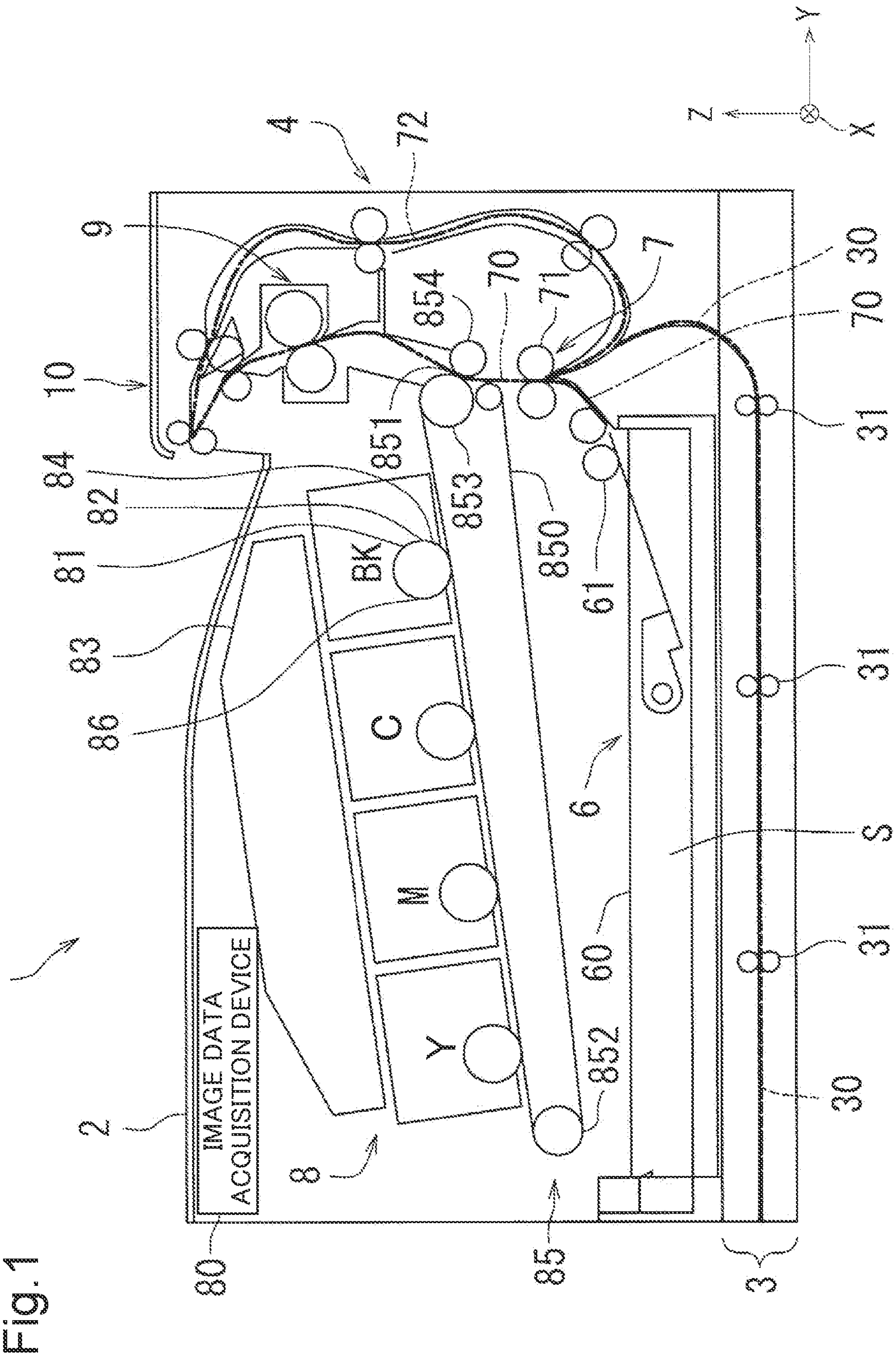
FIG. 1 is a schematic cross-sectional view showing an image forming apparatus according to a first embodiment of the disclosure.

Hereafter, some embodiments of the disclosure will be described, with reference to the accompanying drawings. In the drawings, the same or corresponding elements are given the same numeral, and the description of such elements will not be repeated. The drawings each include indication of an X-axis, a Y-axis, and a Z-axis which are orthogonal to one another. The Z-axis is parallel to a vertical plane, and the X-axis and the Y-axis are parallel to a horizontal plane.

First Embodiment

Figure 2:
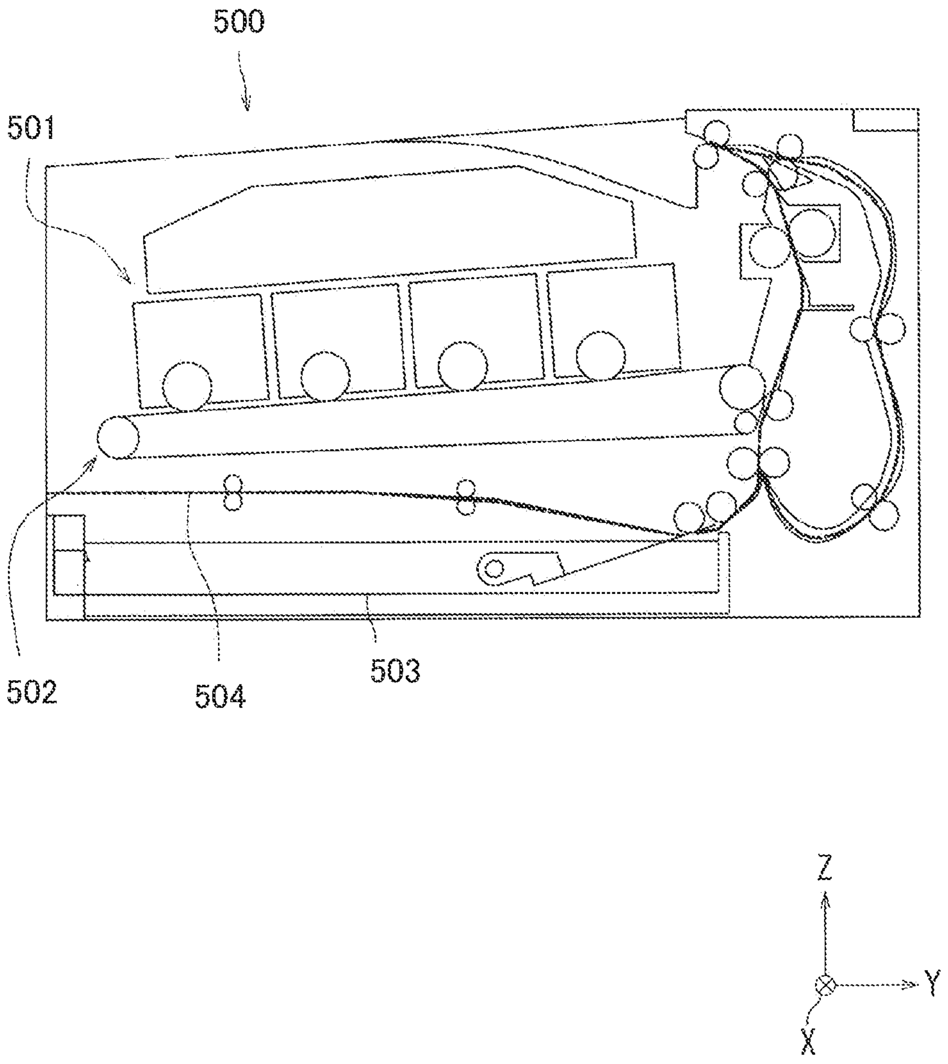
FIG. 2 is a schematic cross-sectional view showing an existing image forming apparatus.
Figure 3:
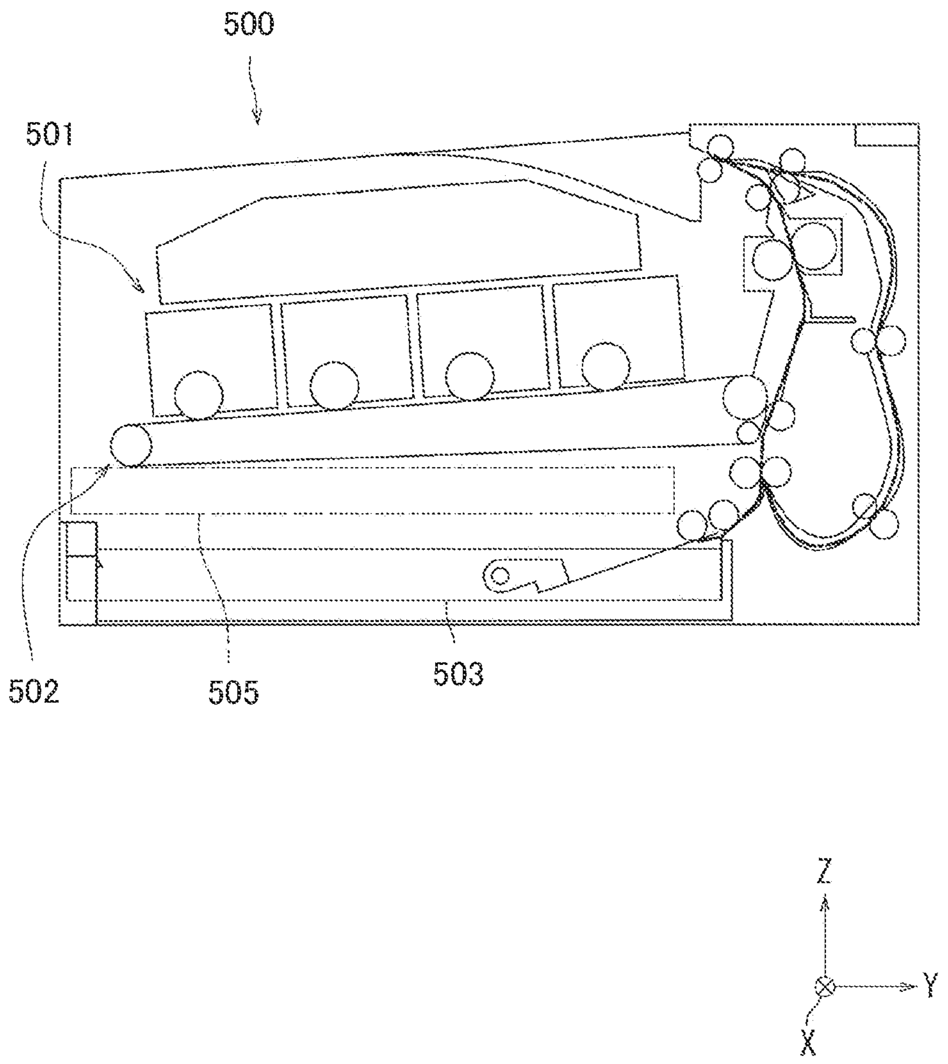
FIG. 3 is a schematic cross-sectional view showing another existing image forming apparatus.
Figure 4:
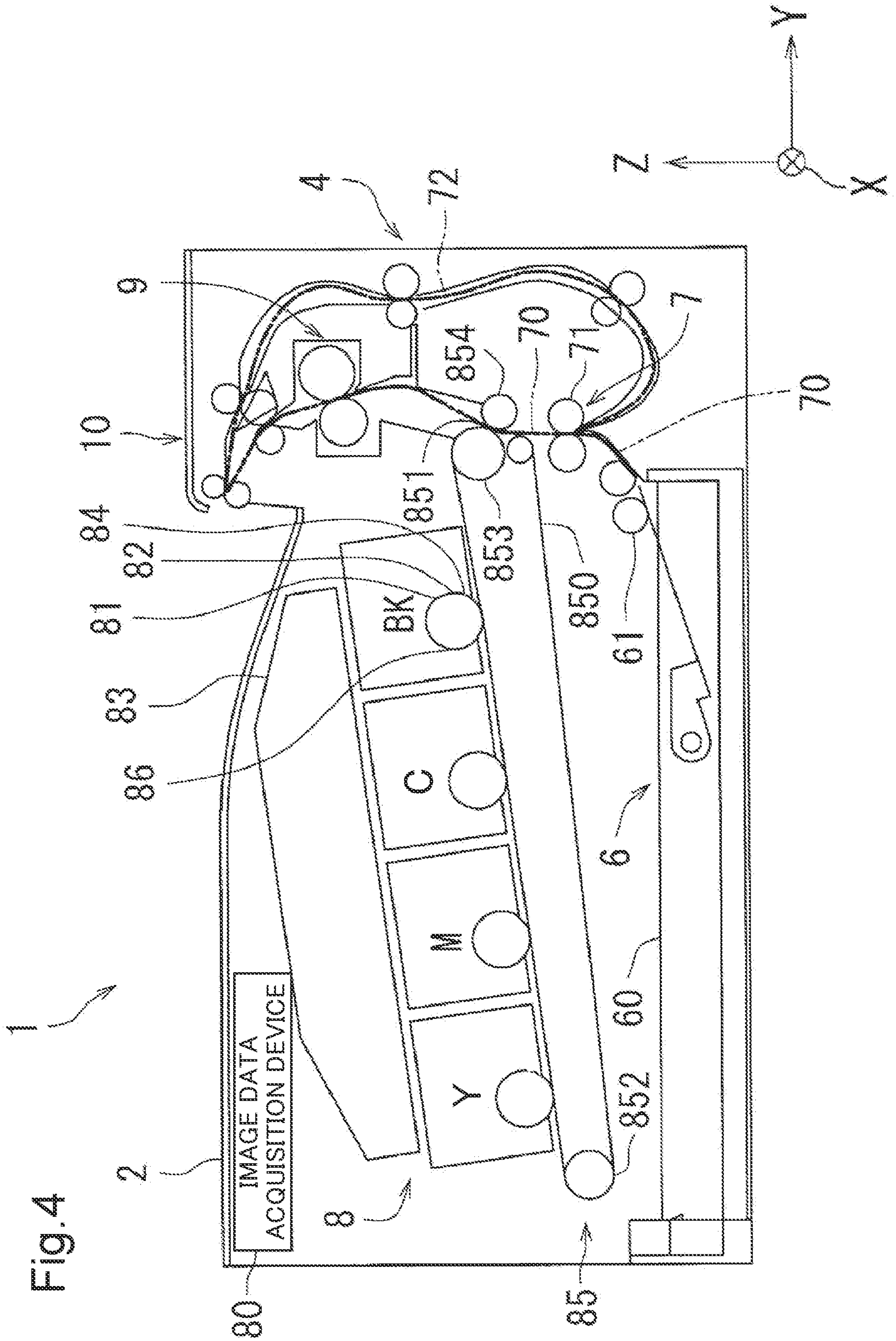
FIG. 4 is a schematic cross-sectional view, showing the image forming apparatus from which a second transport device is removed.

Referring to FIG. 1 to FIG. 4, an image forming apparatus 1 according to a first embodiment of the disclosure will be described hereunder. FIG. 1 illustrates the image forming apparatus 1. FIG. 2 and FIG. 3 each illustrate an existing image forming apparatus, for comparison with the image forming apparatus 1. FIG. 4 illustrates the image forming apparatus 1, from which a second transport device 3 is removed.

The image forming apparatus 1 shown in FIG. 1 is, for example, a printer or a copier. Alternatively, the image forming apparatus 1 may be, for example, a multifunction peripheral (MFP) in which a scanning function, a printing function, a copying function, a facsimile function, and/or other functions are combined.

As shown in FIG. 1, the image forming apparatus 1 includes an apparatus main body 2, a second transport device 3, and a both-sides transport device 4. The image forming apparatus 1 may additionally include a second sheet feeding device 5 shown in FIG. 5. The second sheet feeding device 5 will be subsequently described in detail, with reference to a second embodiment.

In the case where the image forming apparatus 1 is an MFP, the image forming apparatus 1 may include a document reading device. The document reading device includes, for example, a document feeding device and an image reading device. The document feeding device includes, for example, a document tray, a document feeding device, a document sensor, and a document discharge device. The document feeding device can be typically exemplified by an automatic document feeder (ADF).

The image reading device includes an optical system. The optical system includes, for example, a light emitter, a lens, a reflecting mirror, and a photodetector. The image reading device reads the image from a source document delivered from the document feeding device. The image reading device generates image data, from the image that has been read. The image reading device can be exemplified by a scanner that employs a contact image sensor (CIS) or a charge-coupled device (CCD).

The image forming apparatus 1 includes, in the case of an electrophotography system for example, a first sheet feeding device 6, a first transport device 7, an image forming device 8, a fixing device 9, and a sheet delivery device 10. When the image forming apparatus 1 is an ink jet printer for example, the image forming device 8 includes at least an ink tank, an ink cartridge, and ink heads. When the image forming apparatus 1 is the ink jet printer, the fixing device 9 may be excluded.

Hereunder, detailed configuration of the apparatus main body 2, the second transport device 3, and the both-sides transport device 4 will be described.

Apparatus Main Body 2

The apparatus main body 2 constitutes the casing of the image forming apparatus 1. Inside the apparatus main body 2, a first sheet cassette 60, a first transport route 70, and the image forming device 8 are provided. The apparatus main body 2 includes the first sheet feeding device 6, the first transport device 7, the image forming device 8, the fixing device 9, and the sheet delivery device 10.

The first sheet feeding device 6 feeds a sheet S. The first sheet feeding device 6 includes the first sheet cassette 60, and a first pickup roller 61. The first sheet cassette 60 is for storing the sheet S therein. The first sheet cassette 60 is the regular cassette of the image forming apparatus 1 and, for example, used to store the sheet S of a standard size, such as A4. The first pickup roller 61 picks up the sheets S stored in the first sheet cassette 60 one by one from the top.

The first transport device 7 includes the first transport route 70, a first transport roller 71, and a both-sides transport route 72. To the first transport route 70, the sheet S is delivered from the first sheet cassette 60. To be more specific, the sheet S picked up by the first pickup roller 61 from the first sheet cassette 60 is delivered to the first transport route 70. The first transport roller 71 includes a pair of transport rollers. The first transport roller 71 defines a nip region, and transports the sheet S delivered to the first transport route 70, to the image forming device 8. A plurality of sets of such first transport rollers 71 may be provided, along the first transport route 70. The first transport roller 71 is driven to rotate by a transport motor.

As shown in FIG. 1, the image forming device 8 forms an image based on the image data of the sheet S transported along the first transport route 70, in the case of the electrophotography. The image forming device 8 form an ink image based on the image data on the sheet S, in the case of the ink jet printing. In this embodiment, it will be assumed that the image forming device 8 is based on the electrophotography, unless otherwise specifically noted.

The image forming device 8 includes, for example, an image data acquisition device 80, a photosensitive body 81, a charging device 82, an exposure device 83, a developing device 84, a transfer device 85, and a cleaning device 86.

The image data acquisition device 80 acquires the image data, from the document reading device. The image data acquisition device 80 may acquire the image data from an external device such as a cloud, a server, a personal computer, or another image forming apparatus. The image data acquisition device 80 may be realized, for example, in the form of an application-specific integrated circuit (ASIC).

The photosensitive body 81 includes a photosensitive layer over the surface thereof. The photosensitive body 81 can be exemplified by an organic photoconductor (OPC).

The charging device 82 charges the photosensitive layer of the photosensitive body 81 to a predetermined potential. Examples of the charging device 82 include a corotron or scorotron charger based on contactless discharge, and contact chargers such as a charging roller and a charging brush.

The exposure device 83 irradiates the photosensitive layer of the photosensitive body 81 with a laser beam. The exposure device 83 exposes the photosensitive body 81 to the laser beam, on the basis of the image data acquired by the image data acquisition device 80. As result, an electrostatic latent image is formed on the photosensitive body 81. The exposure device 83 is, for example, an assembly of light emitting diodes (LED), or glass fiber arrays.

The developing device 84 is, for example, a toner cartridge. In the example shown in FIG. 1, the toner cartridges are respectively provided for yellow (Y), magenta (M), cyan (C), and black (Bk). The toner cartridges each include a toner tank and a transport roller.

The photosensitive body 81, the charging device 82, the exposure device 83, the developing device 84, and the cleaning device 86 are provided for each of the colors. In FIG. 1, the reference numerals of the mentioned components are only marked on black (Bk), for the sake of visual clarity.

The developing device 84 supplies the toner to the photosensitive body 81, thereby developing the electrostatic latent image on the photosensitive body 81 with the toner. The toner contains fine particles electrically positive or negative, formed by combining chargeable plastic particles and color particles such as carbon. The toner may be used alone, or as a mixture with a carrier.

The carrier is constituted of fine particles of a magnetic substance, for example coated with an epoxy resin, and may be mixed with the toner. As result of stirring the mixture of the toner and the carrier, the toner obtains an electric charge, thus to stick to the photosensitive body 81 by an electrostatic effect As shown in FIG. 1, the transfer device 85 transfers the image onto the sheet S transported along the first transport route 70. The transfer device 85 may employ a direct transfer method or an indirect transfer method. In the case of the direct transfer, the image formed on the photosensitive body 81 is directly transferred to the sheet S being transported by a transport belt. In the case of the indirect transfer, the transfer device 85 includes, as shown in FIG. 1, a transfer belt 850, a transfer section 851, a drive roller 852, a transfer roller 853, and a pressure roller 854.

The transfer belt 850 carries the image. The transfer belt 850 is stretched around the drive roller 852 and the transfer roller 853. The transfer belt 850 can be exemplified by an intermediate transfer belt. The intermediate transfer belt includes, for example, a base layer, an elastic layer, and a release layer. The drive roller 852 is connected to a drive system such as a motor, and serves to rotate the transfer belt 850.

The transfer roller 853 is caused to rotate, by the rotation of the drive roller 852. The transfer roller 853 causes the transfer belt 850 to revolve, to the position where the image is to be transferred to the sheet S. The transfer roller 853 is pressed by the pressure roller 854 opposed to the first transport route 70, and defines a nip region between the transfer belt 850 and the pressure roller 854. The nip region defined between the transfer belt 850 and the pressure roller 854 constitutes the transfer section 851.

The transfer roller 853 may be rotatably supported by the apparatus main body 2, the image forming device 8, or the transfer device 85. The transfer belt 850 may be configured to revolve about the transfer roller 853, toward the first sheet cassette 60. In the first embodiment, the transfer belt 850 is configured to revolve about the transfer roller 853, toward the first sheet cassette 60. Therefore, a dead space that would otherwise be produced between the transfer belt 850 and the first sheet cassette 60 can be eliminated.

In general, a transfer process includes a first transfer process and a second transfer process. In the first transfer process, the toner image carried by the photosensitive body 81 is transferred to the transfer belt 850. In the second transfer process, the toner image is transferred to the sheet S passing the nip region of the transfer section 851.

The cleaning device 86 removes residual toner stuck to the photosensitive body 81 and the transfer belt 850. The cleaning device 86 can be exemplified by a cleaning blade.

The fixing device 9 heats and presses the toner image formed on the sheet S, thereby fixing the toner image thereon. The fixing device 9 includes, for example, a heat roller, a pressure roller, and a heater.

The heat roller is a hollow roller of a circular cylindrical shape. The pressure roller is pressed against the heat roller, thus to define a nip region in collaboration with the heat roller. The pressure roller is driven to rotate by a drive device, thereby causing the heat roller to rotate, via the nip region defined as above.

The heater heats the heat roller, with power supplied from a power source. The heater is located close to the inner circumferential surface of the heat roller. The sheet S transported along the first transport device 7 is heated by the heater upon passing the nip region, so that the toner image fixed onto the sheet S.

The sheet delivery device 10 delivers the sheet S, to outside of the apparatus main body 2 of the image forming apparatus 1. The sheet delivery device 10 may include a delivery roller and an output tray. The delivery roller serves to deliver the sheet S transported from the fixing device 9 along the first transport device 7, to the output tray. On the output tray, the sheets S that have been delivered as above are stored.

Second Transport Device 3

Still referring to FIG. 1, the second transport device 3 will be described hereunder. The second transport device 3 is a manual feeding device, or a manual transport device. The second transport device 3 may be referred to as a multi-purpose feeder (MPF). The second transport device 3 includes a second transport route 30, a second transport roller pair 31, a slide transport device 32, and a fixed transport device 33. The slide transport device 32 and the fixed transport device 33 will be subsequently described in detail, with reference to a third embodiment.

The second transport route 30 communicates with outside of the image forming apparatus 1, and is utilized to transport the sheet S inserted by the user from outside, to the image forming device 8. In other words, the second transport route 30 is for transporting the sheet S manually inserted by the user. The second transport route 30 extends as far as the image forming device 8.

The second transport roller pair 31 is provided on the second transport route 30, so as to hold the second transport route 30 therebetween. A plurality of the second transport roller pairs 31 may be provided along the second transport route 30. One of the second transport roller pair 31 is connected to a drive system. The one of the second transport roller pair 31 connected to the drive system receives driving force from the drive system, thereby causing the other of the second transport roller pair 31 to rotate.

FIG. 2 and FIG. 3 each illustrate an existing printer 500. As shown in FIG. 2, in the printer 500, a MPF transport route 504, which is a manual transport route, is formed between the image forming device 501/transfer device 502 and the sheet cassette 503. Accordingly, in the case of designing a printer without the MPF transport route 504, on the basis of the existing printer 500, a dead space 505 is produced between the image forming device 501/transfer device 502 and the sheet cassette 503, as shown in FIG. 3. It is essential to eliminate such dead space 505, from the viewpoint of reducing the size of the printer.

According to the first embodiment, in contrast, the second transport route 30 is formed so as to circumvent the region between the image forming device 8 and the first sheet cassette 60, as shown in FIG. 1. Such a configuration eliminates the dead space between the image forming device 8/transfer device 85 and the first sheet cassette 60, thereby contributing to reducing the size of the image forming apparatus 1 as a whole.

The second transport route 30 may be located on the opposite side of the image forming device 8, with respect to the first sheet cassette 60. In the first embodiment, the second transport route 30 is located on the opposite side of the image forming device 8, with respect to the first sheet cassette 60. Such a configuration further assures that the dead space between the image forming device 8/transfer device 85 and first sheet cassette 60 is eliminated, thus further ensuring that the overall size of the image forming apparatus 1 can be reduced.

The second transport route 30 may be located at a lowermost position of the image forming apparatus 1. In the first embodiment, as shown in FIG. 1, the second transport route 30 is provided at the lowermost position in the image forming apparatus 1. Such a configuration further assures that the dead space between the image forming device 8/transfer device 85 and first sheet cassette 60 is eliminated, thus further ensuring that the overall size of the image forming apparatus 1 can be reduced.

The second transport device 3 may be detachably mounted in the apparatus main body 2. In the first embodiment, the second transport device 3 is located at the lowermost position in the image forming apparatus 1 and, as shown in FIG. 1 and FIG. 4, detachably mounted in the apparatus main body 2. Such a configuration allows the second transport device 3 to be provided as an option that can be attached to the apparatus main body 2. In addition, the size of the image forming apparatus 1 can be further reduced, when the second transport device 3 is not attached to the apparatus main body 2, which leads to widened option for the user when using the image forming apparatus 1, according to the needs or intended purpose of use.

Further, the second transport route 30 may be formed so as to merge with the first transport route 70. In the first embodiment, as shown in FIG. 1, the second transport route 30 is formed so as to merge with the first transport route 70. Accordingly, the space for forming the first transport route 70 and the space for forming the second transport route 30 can be unified, which further contributes to reducing the size of the image forming apparatus 1.

When the second transport device 3 is located on the opposite side of the image forming device 8, with respect to the first sheet cassette 60, it is preferable that the curvature radius of the second transport route 30 is larger than the curvature radius thereof, compared with the case where the second transport device 3 is located between the first sheet cassette 60 and the image forming device 8. Such a configuration prevents occurrence of paper jam on the second transport route 30.

The both-sides transport route 72 shown in FIG. 1 is utilized when the printing is performed on both sides of the sheet S. The both-sides transport route 72 is branched from the first transport route 70, on the downstream side of the image forming device 8 in the sheet transport direction, and then merges with the first transport route 70, on the upstream side of the image forming device 8 in the sheet transport direction. The both-sides transport route 72 serves to deliver the sheet S, on one side of which an image has been formed by the image forming device 8, to the image forming device 8 again.

When the second transport device 3 is located on the opposite side of the image forming device 8, with respect to the first sheet cassette 60, it is preferable that the curvature radius of the both-sides transport route 72 is larger than the curvature radius thereof, compared with the case where the second transport device 3 is located between the first sheet cassette 60 and the image forming device 8.

When the second transport device 3 is located on the opposite side of the image forming device 8, with respect to the first sheet cassette 60, a larger space for locating the both-sides transport route 72 becomes available as shown in FIG. 1, compared with the case where the MPF transport route 504 is located between the image forming device 501/transfer device 502 and the sheet cassette 503, like the existing printer 500 shown in FIG. 2 and FIG. 3. Therefore, the curvature radius of the curved portion of the both-sides transport route 72 can be made larger, than in the case of the existing printer 500.

Increasing the curvature radius of the curved portion of the both-sides transport route 72, as in the first embodiment, results in reduced resistance to the sheet S undergoing the duplex printing, applied by the both-sides transport device 4 on the both-sides transport route 72. Therefore, the sheet S can be prevented from jamming on the both-sides transport route 72.

Second Embodiment

Figure 5:
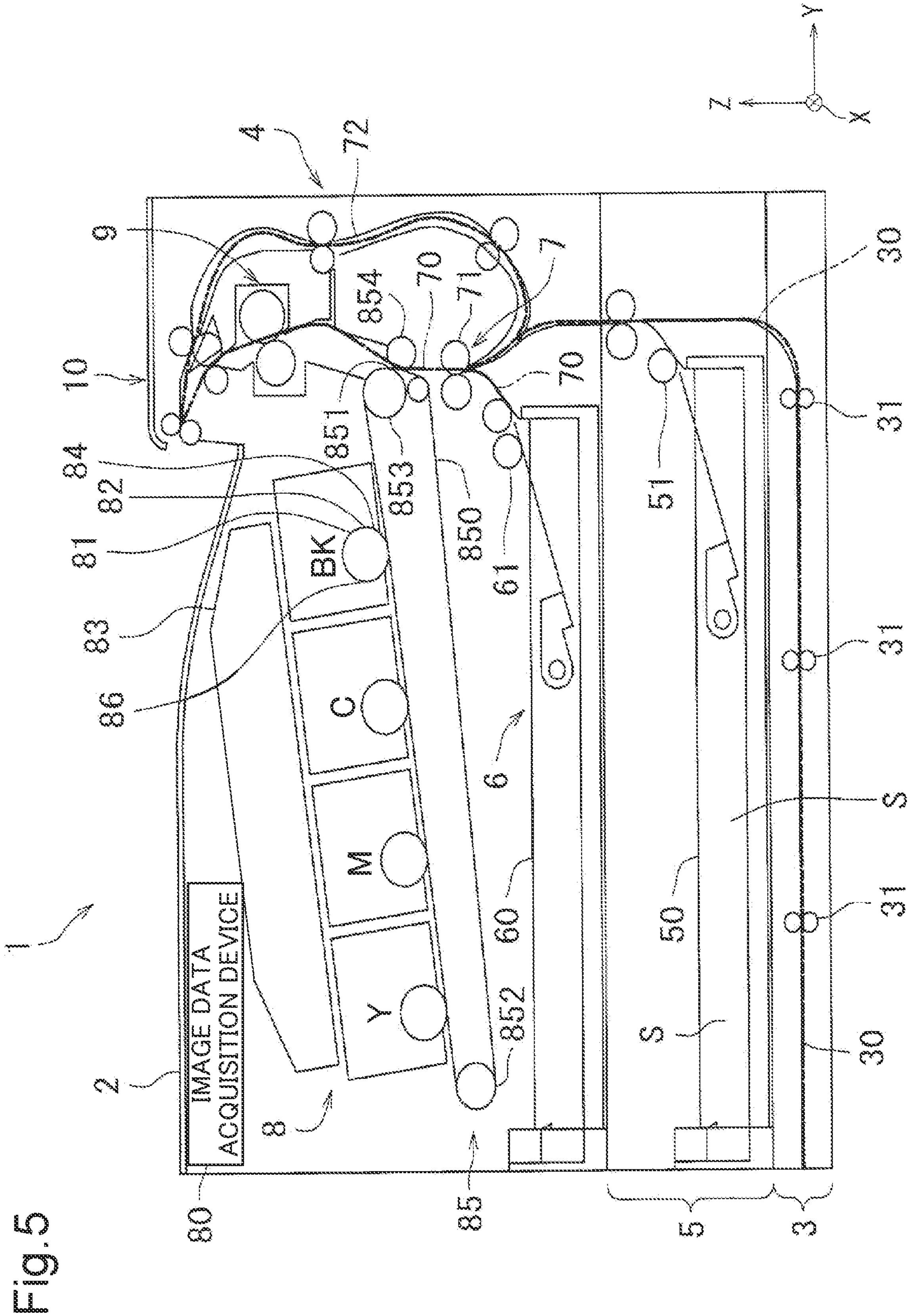
FIG. 5 is a schematic cross-sectional view showing an image forming apparatus according to a second embodiment of the disclosure.

Referring now to FIG. 5, the image forming apparatus 1 according to a second embodiment will be described hereunder. FIG. 5 illustrates the image forming apparatus 1 according to the second embodiment. As shown in FIG. 5, the image forming apparatus 1 according to the second embodiment additionally includes a second sheet feeding device 5, compared with the image forming apparatus 1 according to the first embodiment shown in FIG. 1. The second sheet feeding device 5 may feed the sheets S of the same size as those in the first sheet feeding device 6, or of a different size from those in the first sheet feeding device 6.

The second sheet feeding device 5 includes a second sheet cassette 50 and a second pickup roller 51. The second sheet cassette 50 is for storing the sheets S. The second sheet cassette 50 is additionally provided to the image forming apparatus 1. When the first sheet cassette 60 accommodates, for example, the sheet S of the standard A4 size, the second sheet cassette 50 may accommodate, for example, the sheet S of a standard size such as B4. The second pickup roller 51 picks up the sheets S stored in the second sheet cassette 50 one by one from the top. The configuration of the remaining portions of the second sheet cassette 50 may be the same as those of the first sheet cassette 60.

It is preferable that the second transport device 3 is located on the opposite side of the first sheet cassette 60, with respect to the second sheet cassette 50. It is preferable that the second transport route 30 of the second transport device 3 is located on the opposite side of the first sheet cassette 60, with respect to the second sheet cassette 50. In the second embodiment, the second sheet cassette 50 is located on the opposite side of the image forming device 8, with respect to the first sheet cassette 60. The second transport device 3 is located on the opposite side of the first sheet cassette 60, with respect to the second sheet cassette 50.

With the configuration according to the second embodiment, the curved portion of the second transport route 30 can be made milder, compared with the case where the second transport route 30 is located between the first sheet cassette 60 and the second sheet cassette 50. Therefore, the sheet S can be prevented from jamming on the second transport route 30.

Third Embodiment

Figure 6:
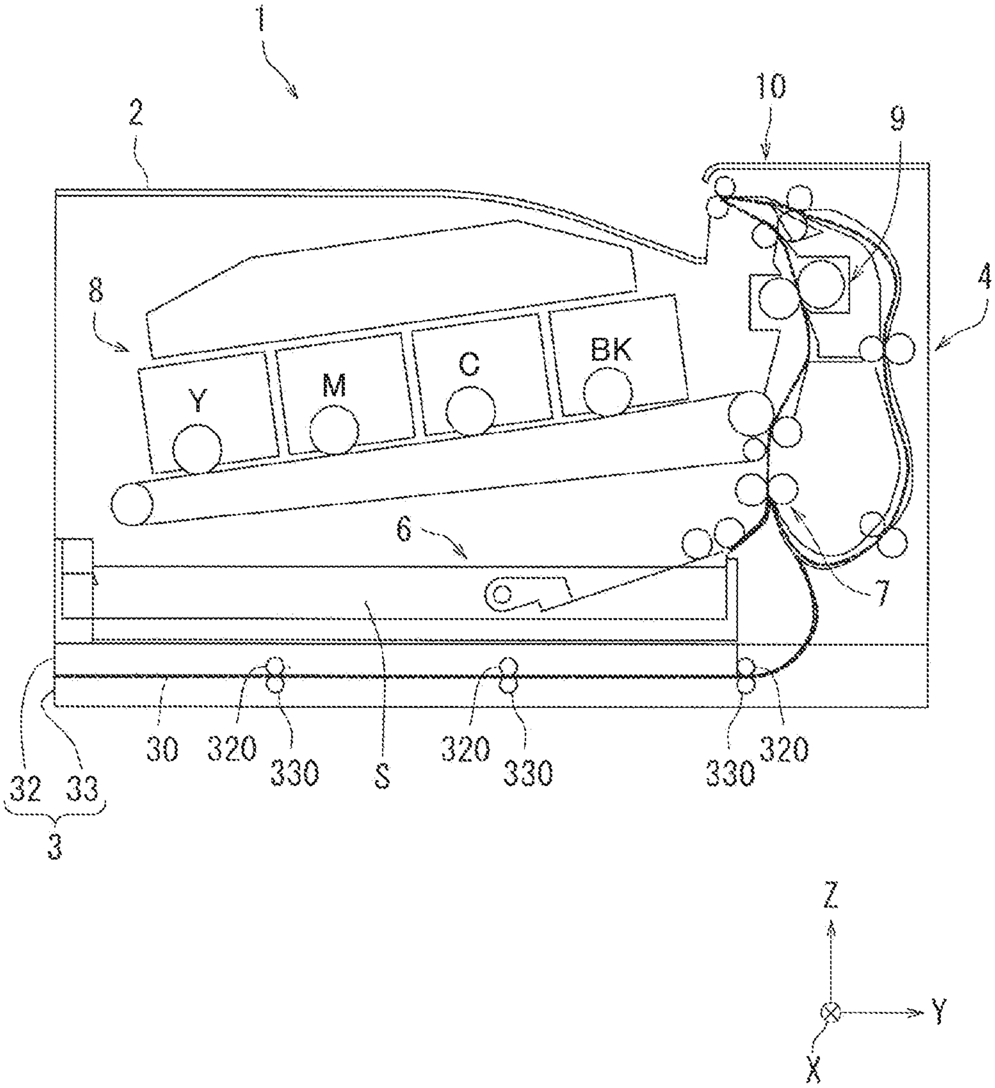
FIG. 6 is a schematic cross-sectional view showing an image forming apparatus according to a third embodiment of the disclosure.
Figure 7:
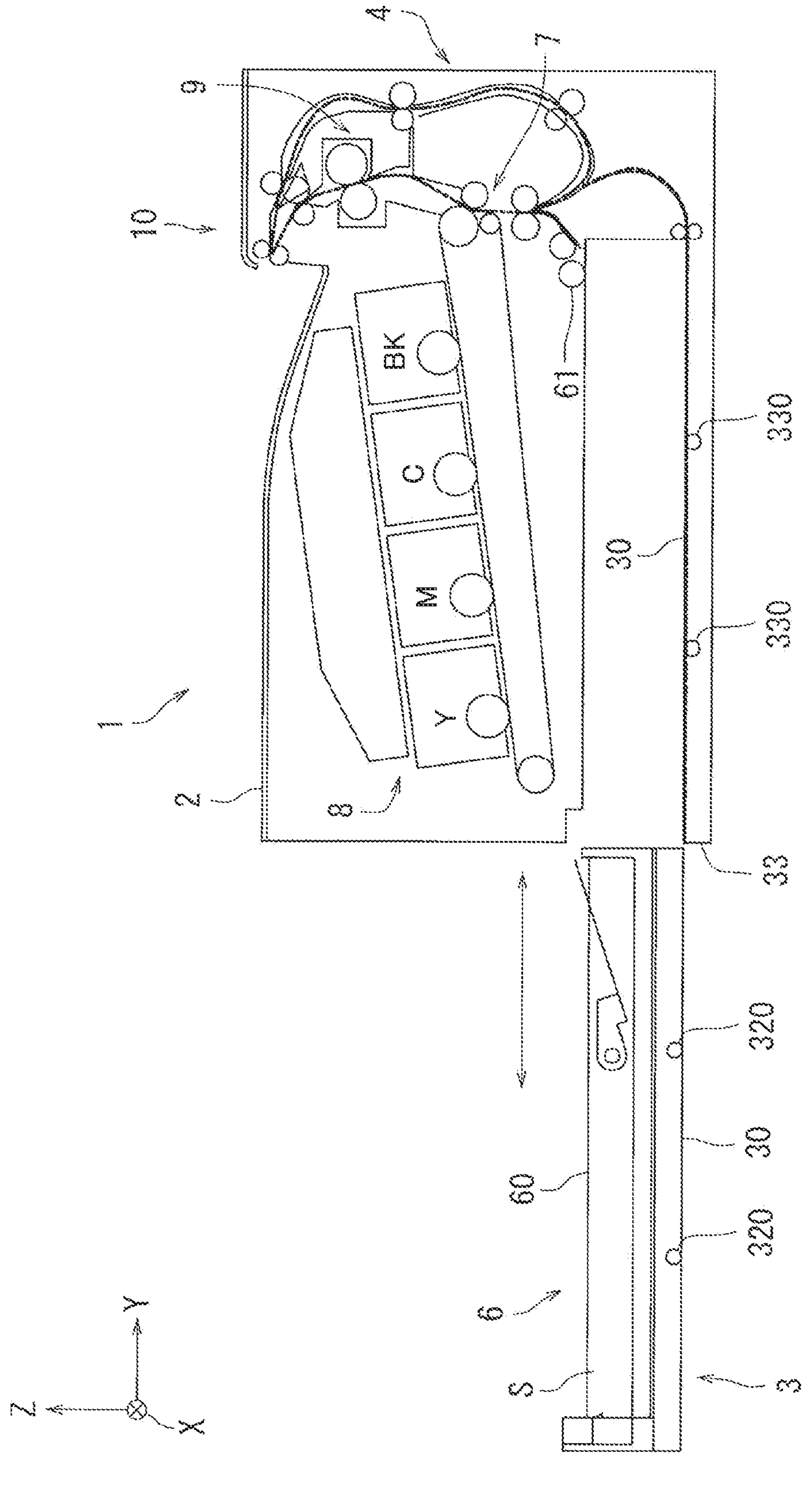
FIG. 7 is another schematic cross-sectional view showing the image forming apparatus according to the third embodiment.

Referring to FIG. 5, FIG. 6, and FIG. 7, the image forming apparatus 1 according to the third embodiment will be described hereunder. FIG. 6 and FIG. 7 each illustrate the image forming apparatus 1 according to the third embodiment. As shown in FIG. 6, the second transport device 3 of the image forming apparatus 1 according to the third embodiment can be connected to the first sheet feeding device 6. The second transport device 3 can be detachably connected to the first sheet feeding device 6.

The second transport device 3 includes a slide transport device 32 and a fixed transport device 33. The second transport route 30 of the second transport device 3 is provided between the slide transport device 32 and the fixed transport device 33. The slide transport device 32 includes a third transport roller 320. The fixed transport device 33 includes a fourth transport roller 330. When the slide transport device 32 is set inside the second transport device 3, the third transport roller 320 of the slide transport device 32 and the fourth transport roller 330 of the fixed transport device 33 are opposed to each other, so as to constitute a pair, as shown in FIG. 6.

A plurality of pairs of the third transport roller 320 and the fourth transport roller 330 may be provided along the second transport route 30. One of the third transport roller 320 and the fourth transport roller 330 is connected to a drive system. The drive system drives one of the third transport roller 320 and the fourth transport roller 330 to rotate, so that the other follows up the rotation.

As shown in FIG. 6 and FIG. 7, the slide transport device 32 is slidable with respect to the fixed transport device 33. The slide transport device 32 may be either unified with the first sheet cassette 60, or connectable thereto. Since the slide transport device 32 is slidable with respect to the fixed transport device 33 as shown in FIG. 7, the user can draw out the slide transport device 32 from the image forming apparatus 1. When the user draws out the slide transport device 32 from the image forming apparatus 1, the second transport route 30 can be exposed.

According to the third embodiment, the slide transport device 32 can be drawn out from the image forming apparatus 1. Therefore, the user can easily take out the sheet S from the second transport route 30, to thereby fix the paper jam that has occurred on the second transport route 30.

The fixed transport device 33 may be detachably mounted in the apparatus main body 2. Further, the apparatus main body 2 may be configured to allow another sheet cassette to be attached thereto, in place of the fixed transport device 33, the other sheet cassette being capable of accommodating a larger number of sheets S than the first sheet cassette 60 and the second sheet cassette 50. Attaching the sheet cassette capable of accommodating a larger number of sheets S leads to reduced number of times of the replenishment of the sheets S.

Further, a lock mechanism, configured to connect and separate the slide transport device 32 and the fixed transport device 33, may be provided. With such a lock mechanism, the fixed transport device 33 and the slide transport device 32 can be drawn out together, in the connected state. In this case, by unlocking the fixed transport device 33 and the slide transport device 32 drawn out together as above, and making the slide transport device 32 to slide relative to the fixed transport device 33, the user can easily fix the paper jam that has occurred on the second transport route 30, outside the apparatus main body 2.

The mentioned configuration of the second transport device 3 according to the third embodiment may be applied to the image forming apparatus 1 according to the second embodiment, shown in FIG. 5. In this case, the slide transport device 32 is slidable with respect to the fixed transport device 33, and either unified with the second sheet cassette 50, or connectable thereto.

The embodiments of the disclosure have been described as above, with reference to the drawings. However, the disclosure is not limited to those embodiments, but may be modified in various manners, without departing from the scope of the disclosure. The drawings are schematically illustrated with a focus on essential elements, for the sake of clarity, and therefore, for example, the number of pieces of the illustrated elements may be different from the actual ones, because of restriction in creation of the drawings. Further, the elements described in the foregoing embodiments are merely exemplary, and not intended to limit the disclosure. Therefore, those elements may be modified as desired, provided that the advantageous effects of the disclosure remain unimpaired.

INDUSTRIAL APPLICABILITY

The disclosure is applicable to the field of the image forming apparatus.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
a first sheet cassette for storing therein a sheet;
a first transport route along which the sheet delivered from the first sheet cassette is transported;
an image forming device that forms an image based on image data, on the sheet transported along the first transport route; and
a second transport route communicating with outside of the image forming apparatus, and along which a sheet inserted by a user from outside is transported to the image forming device,
wherein the second transport route being formed so as to circumvent a region between the image forming device and the first sheet cassette,
the image forming apparatus further comprising:
an apparatus main body accommodating therein the first sheet cassette, the first transport route, and the image forming device; and
a second transport device including at least a portion of the second transport route,
wherein the second transport device is detachably mounted in the apparatus main body.

2. The image forming apparatus according to claim 1,
wherein the second transport device includes a slide transport device and a fixed transport device, and
the slide transport device is slidable with respect to the fixed transport device, and unified with or connectable to the first sheet cassette.

3. The image forming apparatus according to claim 2,
wherein the fixed transport device is detachably fixed to the apparatus main body.

4. An image forming apparatus comprising:
a first sheet cassette for storing therein a sheet;
a first transport route along which the sheet delivered from the first sheet cassette is transported;
an image forming device that forms an image based on image data, on the sheet transported along the first transport route; and
a second transport route communicating with outside of the image forming apparatus, and along which a sheet inserted by a user from outside is transported to the image forming device,
wherein the second transport route being formed so as to circumvent a region between the image forming device and the first sheet cassette,
the image forming apparatus further comprising:
a second sheet cassette for accommodating the sheet; and
a second transport device including at least a portion of the second transport route,
wherein the second sheet cassette is located on an opposite side of the image forming device with respect to the first sheet cassette, and
the second transport device is located on an opposite side of the first sheet cassette with respect to the second sheet cassette.

5. The image forming apparatus according to claim 4,
wherein the second transport device includes a slide transport device and a fixed transport device, and
the slide transport device is slidable with respect to the fixed transport device, and unified with or connectable to the first sheet cassette.

6. An image forming apparatus comprising:
a first sheet cassette for storing therein a sheet;
a first transport route along which the sheet delivered from the first sheet cassette is transported;
an image forming device, being provided above the first sheet cassette, that forms an image based on image data, on the sheet transported along the first transport route; and
a second transport route communicating with outside of the image forming apparatus, being formed so as to merge with the first transport route, and along which a sheet inserted by a user from outside is transported to the first transport route,
wherein the second transport route being formed so as to circumvent a region between the image forming device and the first sheet cassette and being located, along the first sheet cassette, on an opposite side of the image forming device with respect to the first sheet cassette,
the image forming apparatus further comprising a second transport device including at least a portion of the second transport route,
wherein the second transport device includes a slide transport device and a fixed transport device, and
the slide transport device is slidable with respect to the fixed transport device, and unified with or connectable to the first sheet cassette.

7. The image forming apparatus according to claim 6,
wherein the fixed transport device is detachably fixed to the apparatus main body.

8. The image forming apparatus according to claim 6,
wherein the second transport route is formed at a lowermost position in the image forming apparatus.

9. The image forming apparatus according to claim 6,
wherein the image forming device includes a transfer device that transfers the image to the sheet transported along the first transport route,
the transfer device including:
a transfer belt that carries the image; and
a transfer roller that causes the transfer belt to revolve to a position to transfer the image to the sheet,
the transfer roller is rotatably supported by the image forming device, and
the transfer belt is configured to revolve about the transfer roller, in a direction toward the first sheet cassette.

* * * * *